(Model.)

4 Sheets—Sheet 1.

B. J. EDWARDS.
PHOTOGRAPHIC PLATE HOLDER.

No. 540,964.

Patented June 11, 1895.

(Model.) 4 Sheets—Sheet 2.
B. J. EDWARDS.
PHOTOGRAPHIC PLATE HOLDER.

No. 540,964. Patented June 11, 1895.

(Model.)  4 Sheets—Sheet 3.
B. J. EDWARDS.
PHOTOGRAPHIC PLATE HOLDER.
No. 540,964. Patented June 11, 1895.
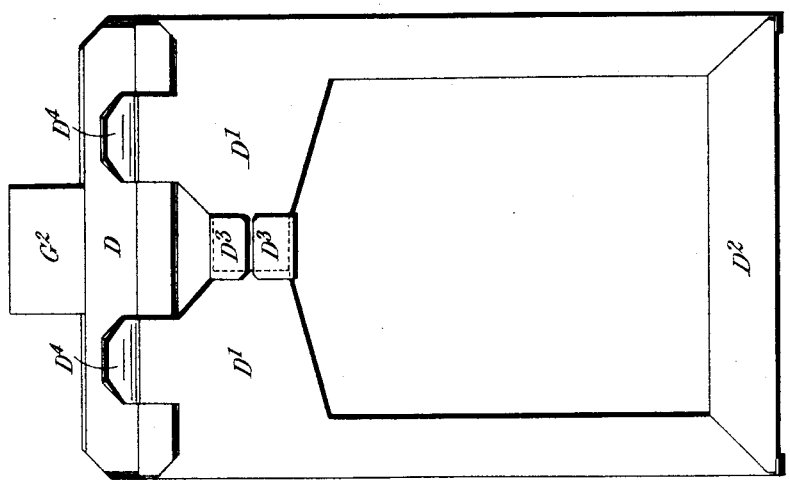
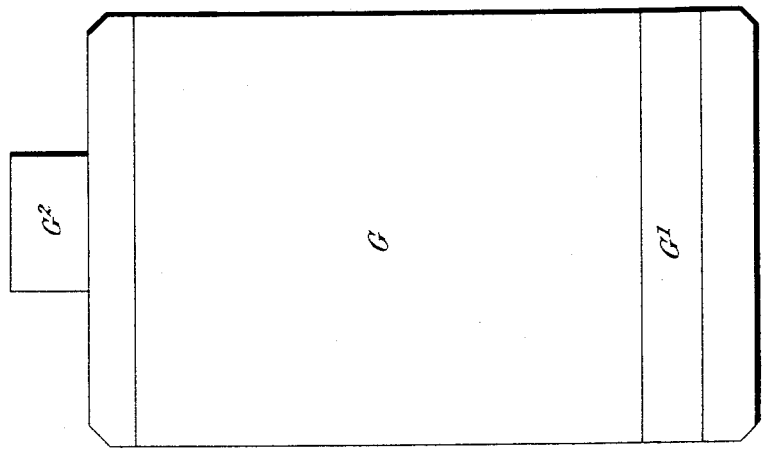
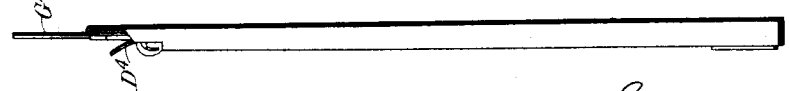
Witnesses:— Inventor: Benjamin Joseph Edwards (Model.) 4 Sheets—Sheet 4.
B. J. EDWARDS.
PHOTOGRAPHIC PLATE HOLDER.

No. 540,964. Patented June 11, 1895.

UNITED STATES PATENT OFFICE.

BENJAMIN J. EDWARDS, OF LONDON, ENGLAND.

PHOTOGRAPHIC-PLATE HOLDER.

SPECIFICATION forming part of Letters Patent No. 540,964, dated June 11, 1895.

Application filed October 29, 1892. Serial No. 450,356. (Model.) Patented in England March 31, 1892, No. 6,278.

*To all whom it may concern:*

Be it known that I, BENJAMIN JOSEPH EDWARDS, manufacturer, a subject of the Queen of Great Britain, and a resident of London, England, have invented certain new and useful Improvements in Plate or Film Holders for Photographic Purposes, (for which I have obtained a patent in Great Britain, No. 6,278, dated March 31, 1892,) of which the following is a specification, reference being had to the accompanying drawings.

My invention relates to photographic plates or film-holders, and is intended to improve the construction and to reduce very considerably the cost, weight and size of such articles.

My improved plates or film-holders are made of thin sheet metal and comprise the improvements hereinafter set forth.

Figure 1:
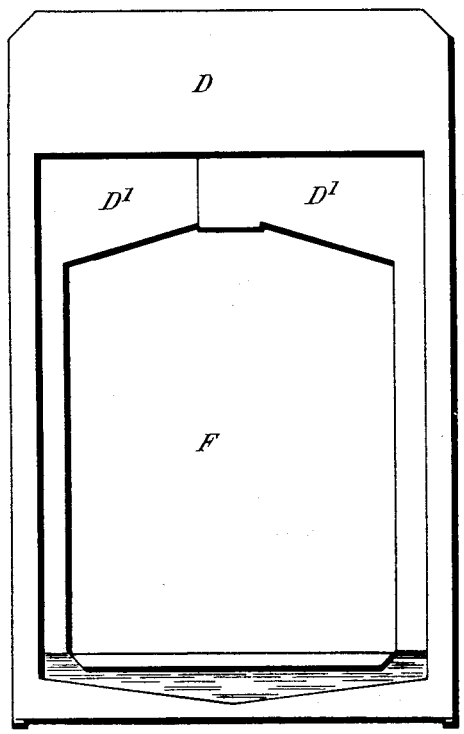
Figure 2:
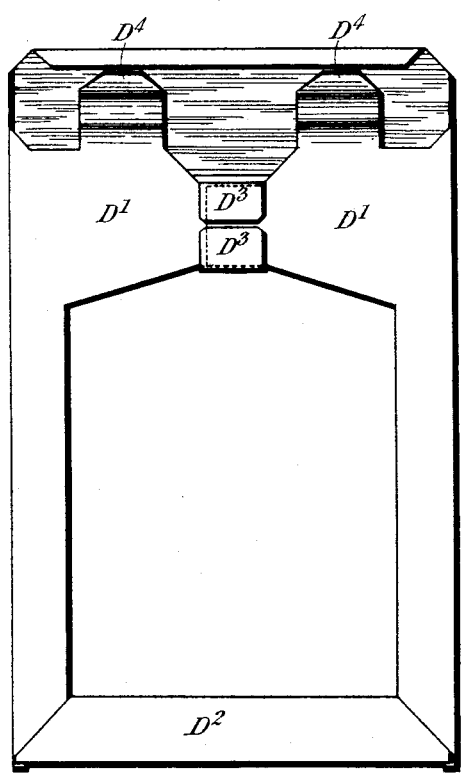
Figure 3:
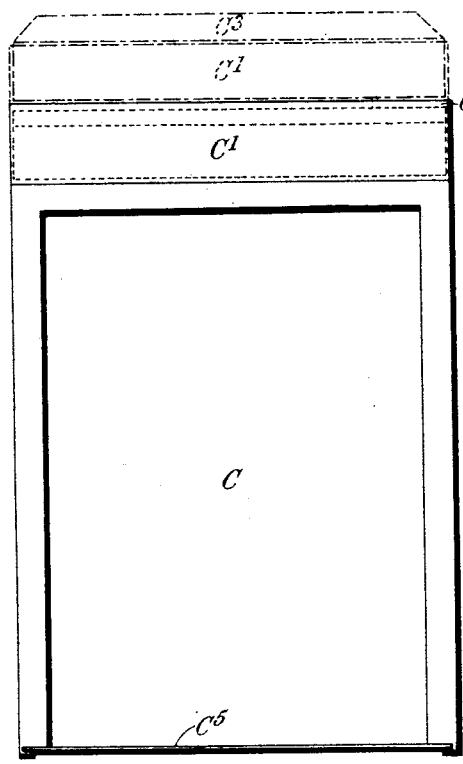
Figure 7:
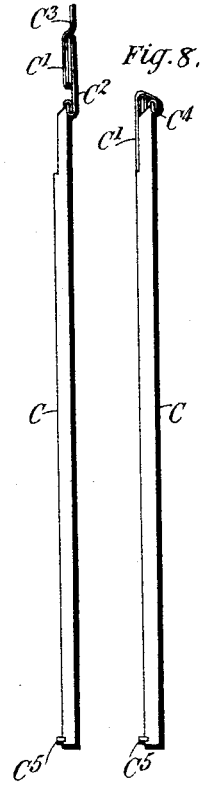
Figure 8:
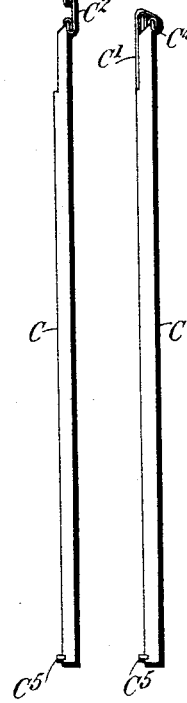
Figure 4:
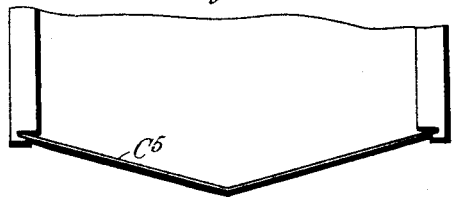
Figure 5:
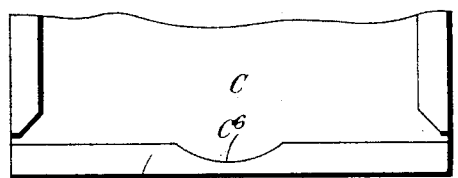
Figure 6:
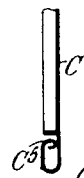
Figure 12:
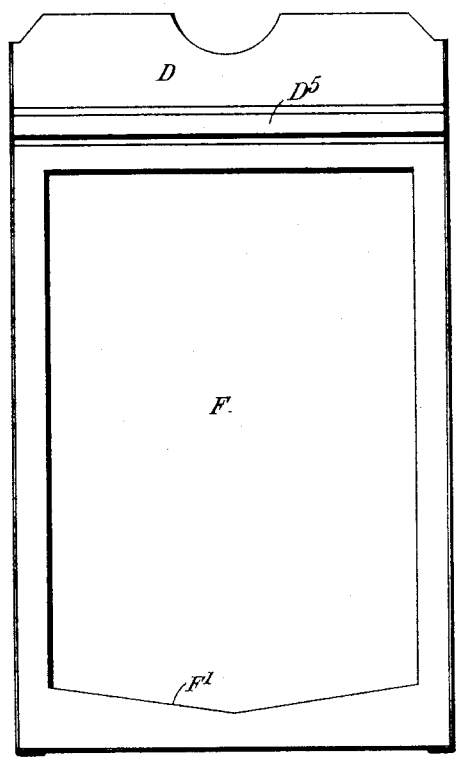
Figure 13:

In the accompanying drawings, which illustrate my invention, Figure 1 is a front view, and Fig. 2 is a rear view, of the case or frame of my improved plate or film holder. Fig. 3 is a front view of the inner carrier, the flap hereinafter described being shown by full lines in the closed position and by dotted lines in the open position. Fig. 4 shows the lower end of a slightly-modified form of inner carrier. Fig. 5 is a front view, and Fig. 6 is a side view, of the lower end of another slightly-modified form of inner carrier. Fig. 7 is an edge view, with the flap open, of the inner carrier shown in Fig. 3. Fig. 8 is a similar view with the flap shut. Fig. 9 is a view of the slide. Fig. 10 is a rear view of the plate or film holder complete. Fig. 11 is an edge view of the plate or film holder complete. Fig. 12 is a front view of the outer case of a double plate or film holder hereinafter described, and Fig. 13 is an edge view of the double inner carrier for the said double holder.

Like letters of reference indicate corresponding parts throughout the drawings.

The plate or film-holder constructed according to my invention comprises a sheath or carrier for the film or plate, an outer case, and a slide sliding between the inner carrier and the case, or in the case of a double plate or film-holder two slides, one on each side thereof. The inner carrier C is provided with a light-tight cut-off or stop C' at the top to prevent the light reaching the plate or film when it is in position in the outer case. This light-tight stop I make in the form of a hinged flap of wood, metal or card board covered with velvet or cloth $C^2$, by means of which covering it is hinged to the carrier. The lower edge of the said flap is formed with a recess $C^3$ so as more perfectly to cover the end of the plate, and when films are used, to hold the film down in its place so that it will not obstruct the insertion of the slide. The ridge $C^4$ formed by the flap attachment serves for conveniently drawing the inner carrier out of the outer case. $C^5$ is a stop formed at the lower end of the carrier by turning up a portion of the metal back of the said carrier. Instead of forming a square stop as shown in Fig. 3, I sometimes provide a rounded stop as shown in Figs. 5 and 6. I may if desired allow room underneath the said stop for the film to slide in. I sometimes form a recess $C^6$ to admit the finger therein for the purpose of pushing out the film readily. The stop $C^5$ serves as a support for the slide which passes over the said stop and is thereby prevented from being pressed inward. This stop may be made V-shaped as shown in Fig. 5.

The outer case is of thin sheet metal which I in some instances stamp or cut to the required shape from a single piece of metal. This piece of metal is bent or folded so as to form the frame or case into which the inner sheath or carrier above described slides. The back of the said frame or case is formed by the wings D' D' and the portion $D^2$, these parts being turned over to form the case or frame.

The edges of the wings D' D' overlap each other and are secured together by clips $D^3 D^3$, which are stamped or cut out solid with one of the wings D' and are folded over the other part D' to hold both in position. By this improved method of construction no soldering is required to hold the frame together.

$D^4 D^4$ are spring pieces formed solid with the wings D' D'. They are bent as shown more clearly in Fig. 11, for the purpose of retaining the inner slide or carrier in position when it is inserted in the frame.

To insure light-tightness at the top and bottom of the frame I sometimes fix thereto strips of velvet or cloth which may be conveniently secured to the inside of the case or frame by folding or turning up the edges of the metal of which the frame is formed. In like manner I secure the hinged light-tight flap or cut-off C' to the inner frame or carrier C.

The strip of velvet at the top may be dispensed with, and a depression formed instead thereof in the inner face of the metal of the outer case as shown at D⁵ Fig. 12 which I find answers the purpose very well, the light-tight cut-off or flap on the inner carrier being constructed and hinged so that it will spring forward into the said recess and so prevent the admission of light into the holder.

I do not confine myself to making the outer case in one piece, as I sometimes make the same of two pieces, one forming the front, and the other the back, the said pieces being joined together by soldering or otherwise at the side.

To prevent light entering through the opening in the back of the outer case and spoiling the picture I cover said opening with a thin strip of cardboard, as will be obvious. In the double slide hereinafter described the extra shutter serves this purpose.

The opening F in front of the outer case or frame through which the plate or film is exposed is formed with its lower edge F' V-shaped as shown, for the purpose of enabling the film and also the slide to be properly inserted without risk of being stopped or obstructed by the said lower edge of the opening.

I form the slide G which covers the exposure opening, of very thin cardboard or other suitable material. It is very important that the frame be so constructed that the slide can be pressed properly home so as to completely protect the plate or film from light when the plate or film-holder is removed from the camera. With the V-shaped edges of the lower end of the exposed aperture a very thin slide may be safely used without fear of catching on the lower edges of the opening and so causing the plate or film to be spoiled by light when the plate or film-holder is removed from the camera. For further protection I sometimes fix on the inside of the slide and near its lower end a strip of velvet G' which rests upon the surface of the plate or film and serves when the slide is withdrawn to wipe from the film any dust which may have collected thereon.

I may provide the slide with a tab G² to facilitate its withdrawal. This tab can be made to serve as an indicator to show when the plate has been exposed, by turning it down when the slide is replaced after the exposure of the plate. This is provided for in the construction of the plate or film-holder which allows for the insertion of the tab between the slide and the outer case.

My improved plate or film-holder is exceedingly light and cheap to make, and being very thin it occupies much less room than does any holder for the same size of film heretofore in use. It is moreover very strong and more durable than dark slides of the ordinary construction.

It is obvious that I can make my plate or film holder of any suitable metal or material, and, when a specially light holder is required, I make it of aluminum for which it is by its construction specially adapted.

As a further modification of my invention, I sometimes make my plate holder double, in which case the front and back of the outer casing are constructed alike. The double carrier may be made from two single carriers such as above described fastened back to back as shown in Fig. 13. The said carrier is however preferably made of a single plate of metal or other materials provided with a groove to receive the films.

What I claim is—

1. In a plate or film-holder the combination of an outer folded sheet metal case having an exposure opening and an inner sheet metal film carrier that receives and incloses the film or plate and has a light-tight flap or cut-off, substantially as described.

2. In a plate or film-holder the combination of an outer folded sheet metal case having an exposure opening and an inner sheet metal carrier, that receives and incloses the film or plate substantially as described.

3. In a plate holder the combination with an outer folded sheet metal case having an exposure opening, and formed with a recess, of an inner sheet metal carrier, and a light-tight cut-off secured to said inner carrier and adapted to engage the recess in said outer case, substantially as described.

4. In a plate or film-holder the combination with an outer folded sheet metal case having an exposure opening, of an inner sheet metal film carrier having a groove to receive the film, and a light-tight cut-off hinged to said inner carrier, substantially as described.

5. In a plate or film-holder the combination with a folded sheet metal case having front and back exposure openings, of an inner sheet metal film carrier, light-tight cut-offs secured thereto, and slides sliding between the outer case and the inner carrier one on each side of the latter, substantially as described.

6. In a dark slide the combination with an outer metal case having a recess and an exposure opening, of an inner film carrier constructed of metal and having grooves at the sides to receive the film, and turned at lower end to form a stop for the film, a light-tight flap or cut-off hinged to the upper end of the slide, and adapted to enter said recess in the outer metal case, and spring like pieces formed on the case to retain the inner slide or carrier when the latter is inserted in the case, substantially as described.

7. In a plate or film-holder the combination with an inner sheet metal carrier, and a sheet metal outer case formed with spring like pieces to retain the inner carrier in place, and a slide between the outer case and the inner carrier substantially as described.

In witness whereof I have hereunto set my hand this 17th day of October, 1892.

B. J. EDWARDS.

Witnesses:
   GEO. HARRISON,
   EBEN SHEFFIELD.